United States Patent [19]

Peters

[11] 3,821,707

[45] June 28, 1974

[54] WAITRESS CALL SYSTEM FOR COCKTAIL LOUNGE, RESTAURANT, OR THE LIKE

[76] Inventor: Cal F. Peters, 11100 Gibson S.E. D78, Albuquerque, N. Mex. 87123

[22] Filed: July 23, 1973

[21] Appl. No.: 381,744

[52] U.S. Cl. .............................. 340/171 R, 340/286

[51] Int. Cl. ............................ H04q 9/10, G08b 7/00

[58] Field of Search ............ 340/171 R, 171 A, 286, 340/311, 312; 325/361

[56] References Cited

UNITED STATES PATENTS

| | | | |
|---|---|---|---|
| 1,796,668 | 3/1931 | Sarfaty | 340/286 X |
| 3,233,217 | 1/1966 | Bost, Jr. | 340/171 R X |

FOREIGN PATENTS OR APPLICATIONS

| | | | |
|---|---|---|---|
| 1,176,460 | 1/1970 | Great Britain | 325/361 |

*Primary Examiner*—Donald J. Yusko
*Attorney, Agent, or Firm*—Jessup & Beecher, Keith D. Beecher

[57] ABSTRACT

A wireless call system is provided which includes a central transmitter that is activated by the operation of any one of a multiplicity of switches respectively located at the different tables or booths at a cocktail lounge, restaurant or the like. The actuation of any one of the switches causes the transmitter to transmit a signal of a particular distinctive frequency identifying the table at which the particular switch was operated. A receiver is mounted on the waitress' tray which responds to the signals transmitted by the transmitter and which is coupled to a plurality of indicating lights mounted on the tray relating to the different tables or booths. Selective means is included in the receiver circuit, so that when a particular switch at a particular table is operated, a corresponding light on the waitress' tray is energized so as to inform the waitress that service is desired at the designated booth or table.

5 Claims, 4 Drawing Figures

WAITRESS CALL SYSTEM FOR COCKTAIL LOUNGE, RESTAURANT, OR THE LIKE

BACKGROUND OF THE INVENTION

It is often difficult in a crowded restaurant, or in a darkened cocktail lounge, to attract the attention of the waiter or waitress, when service is desired, without making a spectacle of oneself. The call system of the present invention solves the dilemna, and it provides a simple and straightforward means for quietly and discreetly informing the waitress or waiter in a positive manner that service is desired.

The system of the invention serves to call a waitress or waiter to any specific booth or table in a cocktail lounge, restaurant, or the like, where a customer desires service. As described above, the system consists basically of a signal transmitter which is keyed into operation by an appropriate control, such as a pushbutton switch located at each booth in the lounge or restaurant. A signal receiver is located in each serving tray of each waitress, and there are also numerals on each tray corresponding to the individual numerals assigned to each booth or table. When a customer presses his call button, the corresponding numeral on the waitress' tray is illuminated so as to inform the waitress that service is desired.

In the particular embodiments of the invention to be described, a one way system is disclosed in which the customer communicates with the waitress by causing a light to be illuminated on the waitress' tray, and the waitress responds by approaching the booth so as to perform the desired service. In a more complex system, however, a two-way communication could be incorporated, which would permit the waitress, upon receipt of an indication of a service requirement, to communicate with the patron, and explain, for example, through a loud speaker at the various tables, that she will be there as soon as possible, or two-way communication could be achieved whereby the customer may inform the waitress of his order.

In the embodiments to be described, the signal transmission may be radio electro-magnetic radiation or by inductive coupling. When radio transmission is used, a central transmitter and appropriate antenna is provided, with a receiver and an appropriate antenna being mounted on each waitress' tray. If inductive coupling is used, the transmitter will operate into a coil of wire placed around the periphery of the room as a primary winding, with a second coil of wire being positioned on each tray as a secondary winding inductively coupled to the primary winding.

DETAILED DESCRIPTION OF THE ILLUSTRATED EMBODIMENTS

Figures 1, 2:
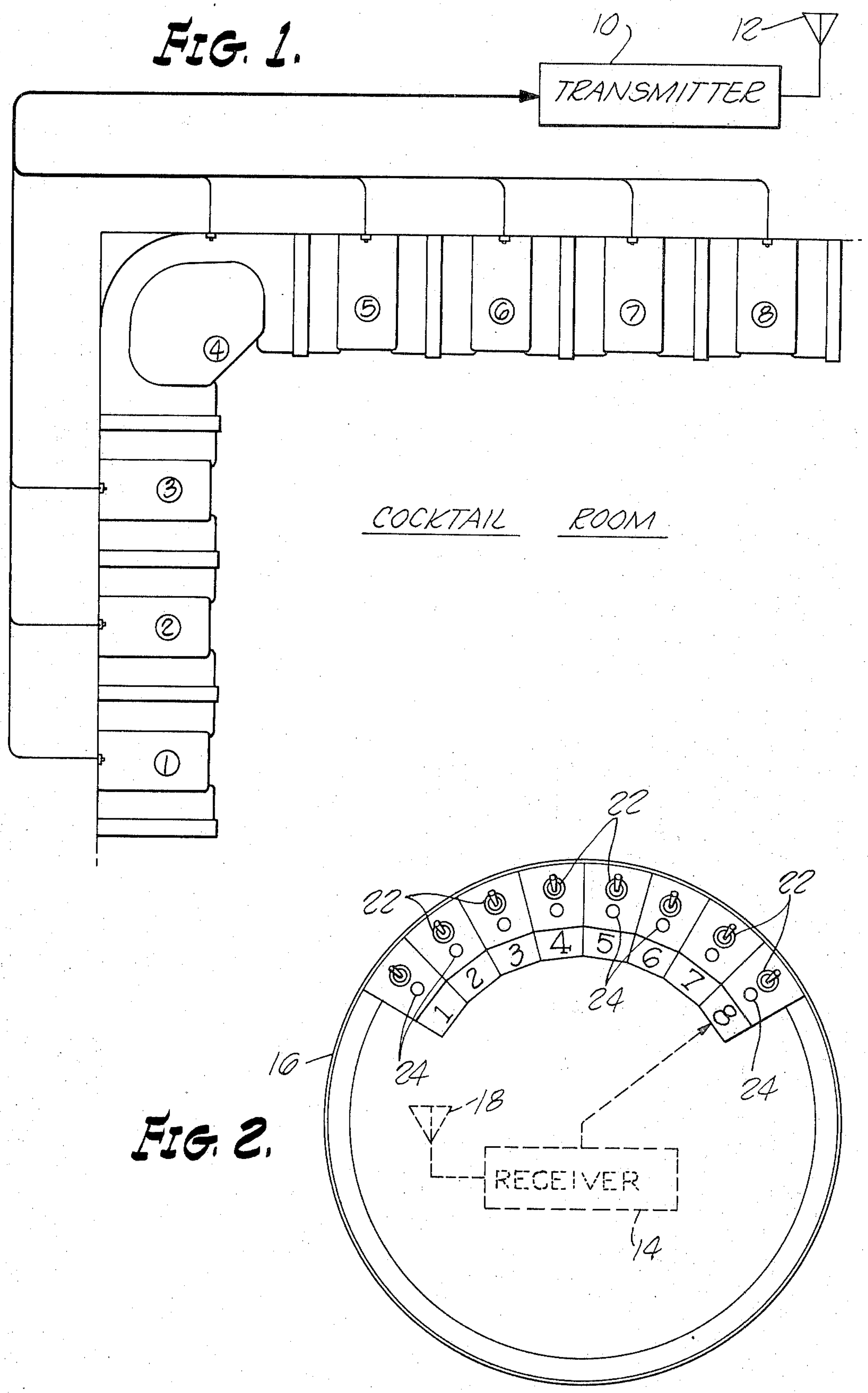
FIG. 1 is a schematic representation of a central transmitter connected to various booths within a cocktail room to be controlled by the patrons at the different booths.
FIG. 2 is a schematic representation of a waitress' tray, which includes a receiving circuit for responding to signals from the transmitter of FIG. 1, and for indicating which one of the booths initiated a control signal from the transmitter thereby to indicate that service is desired at the particular booth.

In the system of FIG. 1, a number of booths designated 1–8 in a cocktail room are connected to a central transmitter 10. The transmitter, in turn, is connected to an appropriate antenna 12. The antenna 12, as explained above, may be a usual radio antenna, or it may be an inductive loop, depending upon whether electromagnetic radiation or inductive coupling is used. A call button may be located in each booth which, when actuated, causes the transmitter 10 to transmit a signal of a frequency distinctive to the booth in which the particular call button was operated.

A corresponding receiver 14 may be mounted on the under side of a waitress' tray 16, such as shown in FIG. 2, and the receiver 14 may be connected to an appropriate antenna 18. Again, the antenna 18 would be a usual radio antenna where electro-magnetic radiation is used, or an inductive coil, when inductive coupling is used.

A plurality of indicating lights 20 are positioned on the tray 16 each bearing a different number, corresponding to the number of the various booths or tables. Then, whenever a particular signal is received from the transmitter corresponding to a particular booth, the corresponding indicating light 20 is illuminated. The tray may also be equipped with a plurality of toggle switches 22 which may be set to either an "on" position or an "off" position. These switches permit the waitress to de-activate the light circuits corresponding to booths served by other waitresses. A plurality of push-button switches 24 are also provided to permit the waitress to de-energize any particular light circuit once the customer has been served.

Figure 3:
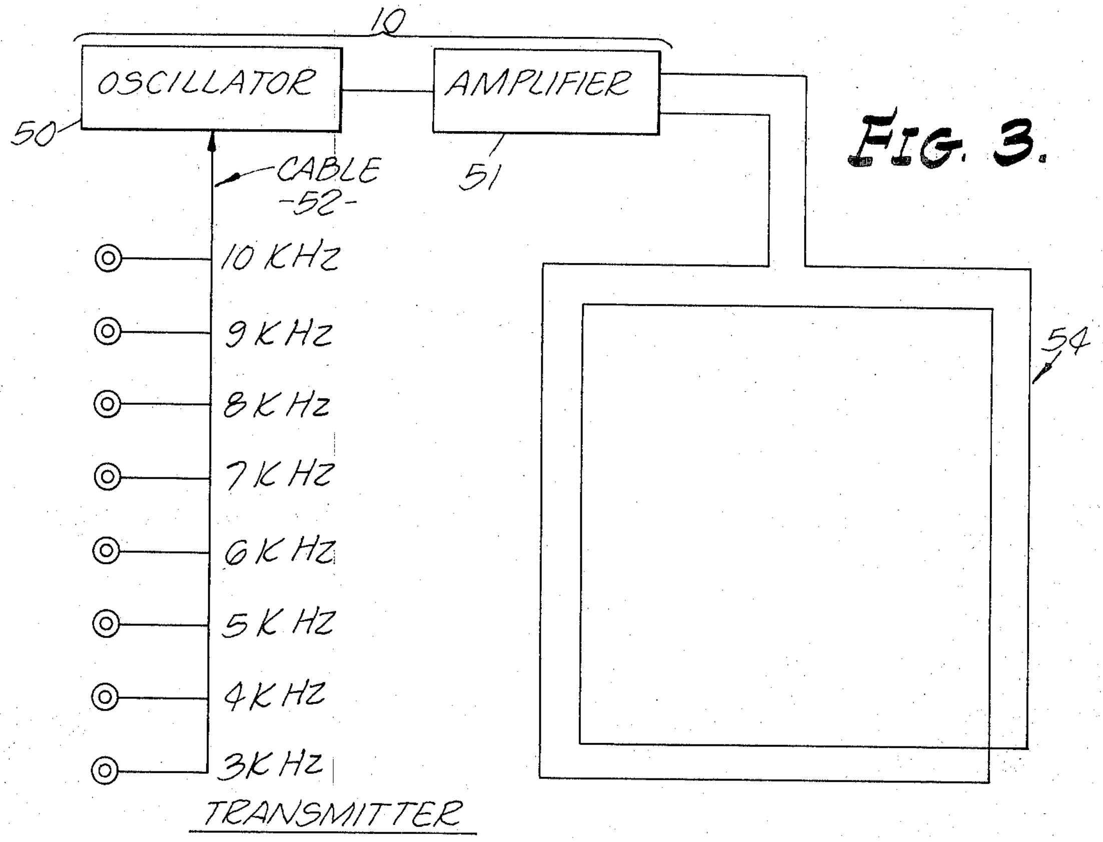
FIG. 3 is a schematic representation of a particular type of transmitting system in accordance with the invention, and which relies on inductive coupling to transmit the signals to the receiver.
Figure 4:
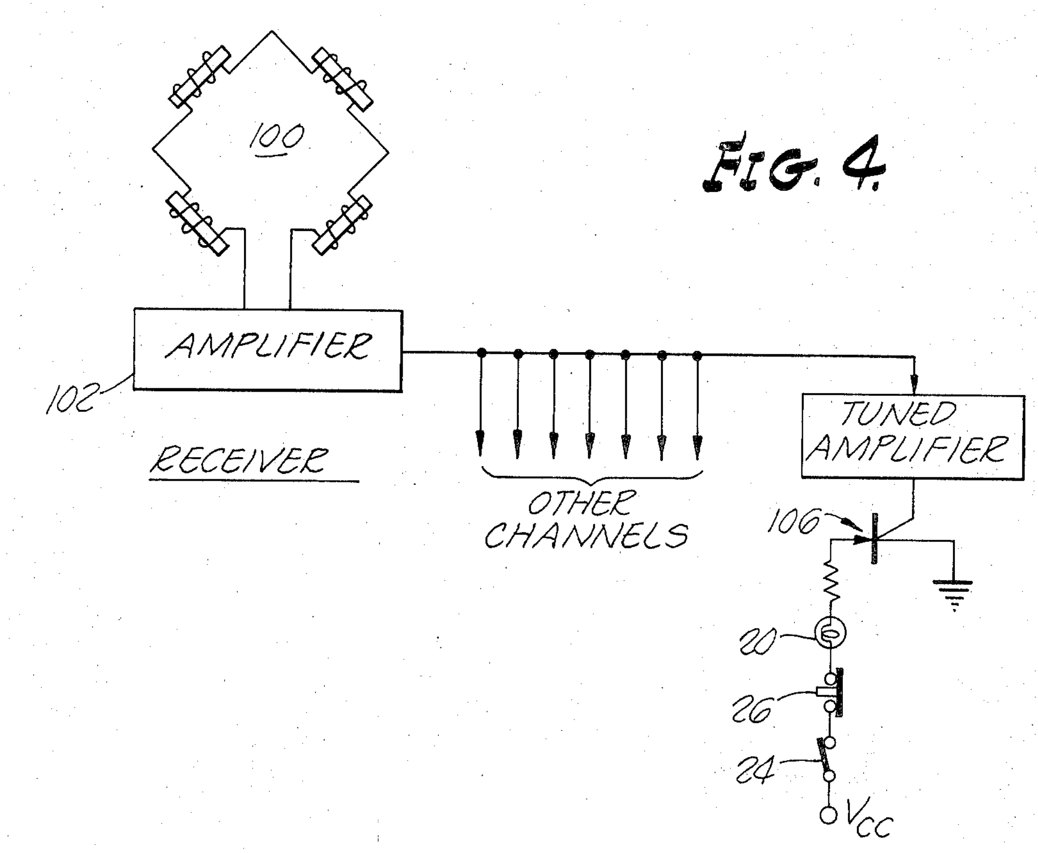
FIG. 4 is a representation of a receiver system partly in block form and partly in circuit detail, for receiving signals from the transmitter of FIG. 3.

As shown in the diagram of FIG. 3, the transmitter 10 may each an oscillator 50 and an amplifier 51. The switches at the various booths are represented in FIG. 3 by a series of push-buttons numbered 1–8, and each push-button is connected to the oscillator 50 through a cable 52. The connection is such that whenever any one of the push-buttons is depressed, the oscillator 50 is caused to generate a signal of a distinctive frequency identifying the operated push-button. These frequencies for the various push-buttons may, for example, be 10, 9, 8, 7, 6, 5, 4, and 3 KHZ.

The amplifier 51 is connected to a loop of wire designated 54 which is mounted as a primary winding around the periphery of the room in which the communication is to take place. The amplifier, for example, may have an output of 15 watts. The primary winding loop 54 may have a minimum of three turns, and the wire size and number of turns may be chosen so that the direct current resistance of the loop will match the output impedance of the amplifier for maximum coupling efficiency.

The receiver on the tray of the waitress may, as shown in FIG. 3, comprise a series of ferrite loop stick radio antennas connected in series-aiding to form a circuit 100, the circuit being connected to an amplifier 102. The inductance of each of the ferrite loops may be of the order of 750 microhenries. The amplifier 102 is connected to a plurality of tuned amplifiers, such as the tuned amplifier 104. The tuned amplifiers are tuned to the different frequencies of the signals transmitted by the transmitter of FIG. 3.

Whenever a particular frequency is received, the corresponding tuned amplifier, such as the amplifier 104 causes an associated silicon controlled rectifier 106 to fire. When that occurs, the corresponding light 20 is energized through the normally closed push-button switch 24 and the toggle switch 22, the switches serving to connect the silicon controlled rectifier to a voltage source designated Vcc. The light 20 remains energized until the push-button 24 is operated by the waitress to de-energize the light. It is clear that when the toggle switch 24 is open, the light circuit is not activated and it does not respond to the corresponding signal passed by the amplifier 104.

The invention provides, therefore, a simple call system which, as indicated above, permits a patron to attract the attention of a waitress in a positive manner, but without creating any type of disturbance.

It will be appreciated that while particular embodiments of the invention have been shown and described, modifications may be made, and it is intended to cover all such modifications that come within the spirit and scope of the invention in the following claims.

What is claimed:

1. A call system for use in an area having a plurality of stations, in which said stations correspond to tables in a cocktail lounge, restaurant or the like, said call system including: a transmitter; a plurality of manually-actuable controls connected to said transmitter and located respectively at the different tables in the area, said controls being manually-actuable to cause the transmitter to transmit different signals respectively identifying the different tables of said plurality; a portable tray; a receiver mounted on said tray for intercepting the different signals transmitted by the transmitter and including a plurality of separate indicating lights on said tray, and signal selective means for passing the different signals selectively to said indicating lights to cause said indicating lights to be individually illuminated to identify the tables at which any of said control signals have been actuated.

2. The call system defined in claim 1, in which said different signals constitute signals having different frequencies.

3. The call system defined in claim 1, in which said transmitter transmits said signals to said receiver by inductive coupling between the transmitter and the receiver.

4. The call system defined in claim 1, in which said transmitter transmits said signals to said receiver by radio electric-magnetic transmission.

5. The call system defined in claim 1, and which includes manually operable switching means mounted on said tray in circuit with each of said indicating lights.

* * * * *